(12) United States Patent
Fauth

(10) Patent No.: US 12,025,731 B2
(45) Date of Patent: Jul. 2, 2024

(54) RADAR SENSOR AND ROBOT USING THE SAME

(71) Applicant: ABB Schweiz AG, Baden (CH)

(72) Inventor: Mathias Fauth, Zug (CH)

(73) Assignee: ABB Schweiz AG, Baden (CH)

( * ) Notice: Subject to any disclaimer, the term of this patent is extended or adjusted under 35 U.S.C. 154(b) by 449 days.

(21) Appl. No.: 17/238,231

(22) Filed: Apr. 23, 2021

(65) Prior Publication Data

US 2021/0239794 A1 Aug. 5, 2021

Related U.S. Application Data

(63) Continuation of application No. PCT/EP2018/079090, filed on Oct. 24, 2018.

(51) Int. Cl.
*G01S 7/40* (2006.01)
*G01S 13/75* (2006.01)
*G01S 13/88* (2006.01)

(52) U.S. Cl.
CPC .............. *G01S 7/40* (2013.01); *G01S 7/4017* (2013.01); *G01S 7/4078* (2021.05); *G01S 13/75* (2013.01); *G01S 13/881* (2013.01)

(58) Field of Classification Search
None
See application file for complete search history.

(56) References Cited

U.S. PATENT DOCUMENTS

| 9,689,982 B2 | 6/2017 | Herthan |
| 2017/0368892 A1 | 12/2017 | Heuermann et al. |
| 2018/0306903 A1* | 10/2018 | Heuel ................... H01Q 1/42 |

FOREIGN PATENT DOCUMENTS

| DE | 102013010993 A1 | 1/2015 |
| DE | 102014017917 B3 | 11/2015 |
| DE | 102017100780 A1 | 7/2018 |
| DE | 202017103676 U1 | 9/2018 |

OTHER PUBLICATIONS

Swathi N. et al., "Radar RCS estimation of a Perfectly Conducting Sphere obtained from a Spherical Polar Scattering Geometry," 2015 International Conference On Electrical, Electronics, Signals, Communication and Optimization (EESCO), pp. 1-7, Jan. 2015, IEEE, Visakhapatnam, India.

* cited by examiner

*Primary Examiner* — Whitney Moore
(74) *Attorney, Agent, or Firm* — Leydig, Voit & Mayer, Ltd.

(57) ABSTRACT

A radar sensor includes: a transceiver unit for emitting a radar beam along a beam path in an outgoing direction and receiving radar radiation along the beam path in an incoming direction; and a reference object placed in the beam path to redirect part of the outgoing radar beam in the incoming direction. The reference object is one of a plurality of reference objects placed in the radar beam. A size of the reference objects in at least one dimension is smaller than a wavelength of the radar beam.

16 Claims, 2 Drawing Sheets

RADAR SENSOR AND ROBOT USING THE SAME

CROSS-REFERENCE TO PRIOR APPLICATION

This application is a continuation of International Patent Application No. PCT/EP2018/079090, filed on Oct. 24, 2018, the entire disclosure of which is hereby incorporated by reference herein.

FIELD

The present invention relates to a radar sensor and to a robot in which the radar sensor is used.

BACKGROUND

Radar sensors are widely used in automotive technology for detecting persons and objects in the vicinity of a vehicle. For instance, DE 10 2013 010993 A1 describes a radar system which is mounted to the rear of a vehicle body and which triggers an automatic opening of the vehicle boot if it detects the user approaching.

In robotics, it is a general practice to install sensors in the vicinity of a robot that are capable to detect the presence of a person, in order to stop a movement of the robot if the person is close enough to be injured if hit by the robot.

In the case of DE 10 2013 010993 A1, if the radar sensor isn't operating properly and fails to detect the approach of a person, the vehicle boot remains closed and has to be opened by hand. In a robot system, on the other hand, if the approach of a person goes undetected, the robot may be moving to the same place as the person, and if both collide, there is a serious risk of injury. Therefore, in robotic applications, it is necessary to detect a possible failure of the radar sensor, so that operation of the robot may be enabled only if it has been established unequivocally that the radar sensor is operating correctly and is capable of detecting the approach of a person.

A conventional way to do so is by detecting a radar echo from a reference object which is placed outside the leakage zone of the radar sensor, in a region where the radar beam from a transceiver of the sensor is expected to propagate.

A drawback of this approach results from the fact that the distance between the transceiver and the sample object must be smaller than the distance in which the person must be detected, since otherwise detection of the reference object might be thwarted by the presence of a person between the radar sensor and the reference object, but the smaller the distance is, the stronger is the radar echo of the reference object. So a situation may arise in which a strong echo from the reference object is detected, but a weaker echo from a person isn't, in which case the safety of the person cannot be ensured. Further, the presence of an echo from the reference object increases the noise from which the echo of a person has to be distinguished, so that it is desirable not to receive both echoes simultaneously. Moveable components by which the radar beam can be directed selectively either on the reference object or into a region where a person is to be detected increase the probability of defects.

SUMMARY

In an embodiment, the present invention provides a radar sensor, comprising: a transceiver unit configured to emit a radar beam along a beam path in an outgoing direction and to receive radar radiation along the beam path in an incoming direction; and a reference object placed in the beam path configured to redirect part of the outgoing radar beam in the incoming direction, wherein the reference object is one of a plurality of reference objects placed in the radar beam, and wherein a size of the reference objects in at least one dimension is smaller than a wavelength of the radar beam.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
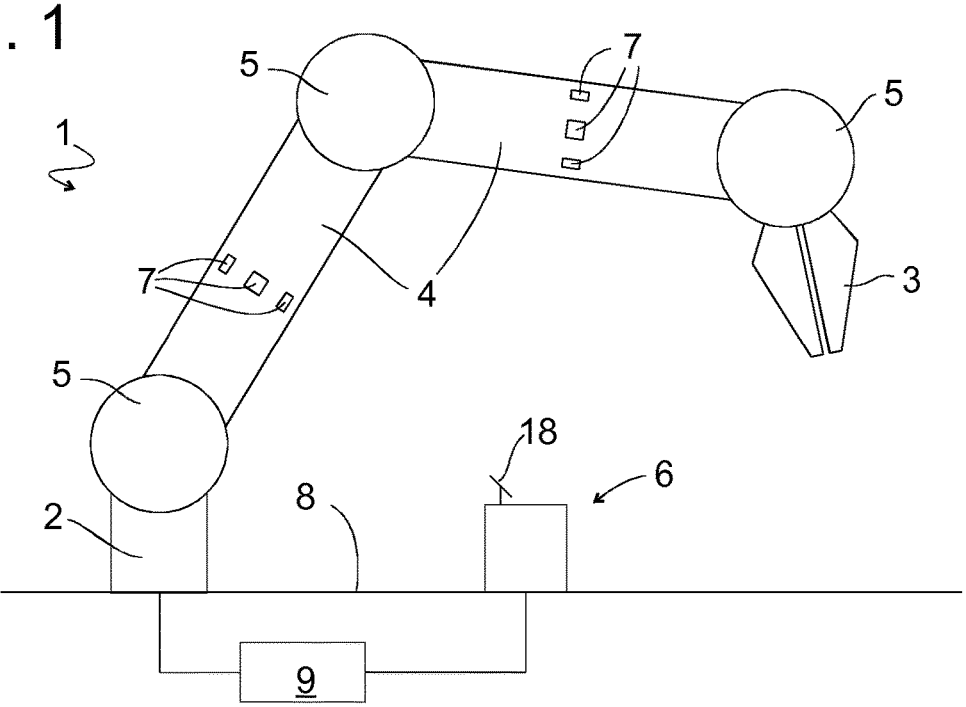
FIG. 1 is a schematic view of a robot system in which the environment of the robot is monitored by radar sensors.

In an embodiment, the present invention provides a radar sensor the correct operation of which can be established with higher reliability.

In an embodiment, the present invention provides a radar sensor comprising a transceiver unit for emitting a radar beam along a beam path in an outgoing direction and receiving radar radiation along said beam path in an incoming direction, a reference object placed in said beam path for redirecting part of the emitted radar beam towards the transceiver, wherein the reference object is one of a plurality of reference objects placed in the radar beam, and the size of the reference objects in at least one dimension is smaller than the wavelength of the radar beam.

At least some of the reference objects should be located beyond a leakage range of the transceiver unit.

By making the reference objects small in at least one direction, the intensity of their echo can be reduced in spite of their potentially close proximity to the radar transceiver. When the size of a reference object is smaller than the radar wavelength, its radar cross section is proportional to the fourth power of the size; therefore the power of the echo of the reference objects can be adjusted to be smaller than that of the echo of a person, so that if the transceiver is sensitive enough to detect the echo of the reference objects, any person will be detected a fortiori.

The size of the reference objects in said first dimension may be smaller than half the wavelength, preferably smaller than a fifth of the wavelength, and still more preferably, smaller than a tenth of the wavelength of the radar beam.

Since due to the small size of the reference object, the power of its echo can be made as small as desired, and there is no need to remove the reference object while monitoring the environment for the presence of a person. Therefore the at least one reference object can be stationarily mounted with respect to the transceiver, so that it is exposed to the radar beam at all times.

In a second dimension orthogonal to said first dimension the size of the at least one reference object can be larger than the wavelength of the radar beam. This facilitates mounting of the reference objects, in particular if at least one end of the elongate reference objects extends beyond the cross section of the radar beam.

Typically, the reference objects can be metallic wires.

Manufacture of the radar sensor is facilitated if each reference object is linear having first and second ends, and if the first and second ends of the reference objects are mounted in a frame.

In order to decrease the influence of possible in homogeneity of the laser beam on the echo from the reference objects, a plurality of said reference objects should be distributed over the cross section of the radar beam, preferably in the form of one or more regular patterns.

Preferably, the reference objects or the patterns formed by these are arranged in at least one plane that intersects the beam.

If reference objects are arranged in first and second regular patterns, the first pattern extending in a first plane that intersects the beam, and the second pattern extending in a second plane which is parallel to the first plane, the radar transceiver can be continuously or discretely tuneable, so as to be selectively operable at at least a first and a second frequency. If the distance between the two patterns equals half the Talbot distance at said first frequency, the first pattern will generate a Talbot pattern in the plane of the second pattern, and the intensity of a radar echo from the second pattern depends on whether its reference objects are located in bright or dark zones of the Talbot pattern.

Specifically, when the transceiver is operated at said first frequency and the reference objects of the second regular pattern are located in dark zones of the Talbot pattern generated by said first regular pattern, they will produce no echo. In that way, although the radar beam propagates across said second regular pattern, formation of a radar echo from the second regular pattern can be avoided, so that radar reflections from other objects can be detected with a minimum of background noise.

Reflection of a radar echo from the first regular pattern cannot be avoided, but this radar echo will go undetected if the first regular pattern is located in the leakage zone of the radar transceiver.

The radar sensor may be mounted on a robot arm, in order to detect persons in the vicinity of the robot and to control movements of the robot based on this detection so as to avoid collisions between the robot and a person.

FIG. 1 is a schematic view of a manufacturing robot 1 comprising a stationary base 2, an end effector 3 and a plurality of elongate links 4 that are pivotably connected to one another, to the base 2 and the end effector 3 by joints 5. The environment of the robot 1 is monitored for the presence of persons by radar sensors 6, 7. The radar sensor 6 is stationary and may be mounted on a workshop floor 8 in the vicinity of the robot base 2. The radar sensors 7 are installed in the links 4.

A controller 9 is connected to the radar sensors 6, 7 and is programmed to slow down or possibly stop the robot 1 if the distance between the robot 1 and a person drops below a predetermined threshold.

Figure 2:
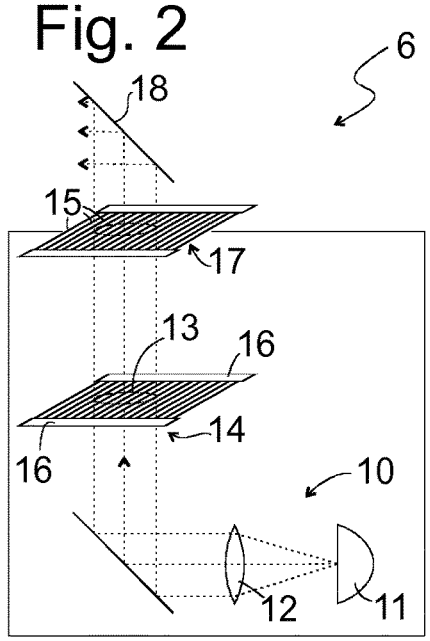
FIG. 2 is a schematic cross section of one of the radar sensors of FIG. 1.

A schematic cross section of the stationary radar sensor 6 is shown in FIG. 2. A transceiver 10 is provided for transmitting and receiving radar signals. If necessary, a lens 12 may be provided for shaping, in particular collimating, the radar waves emanating from antenna 11 into a beam 13, and for focusing a reflected radar echo onto the transceiver 10.

A receiving channel of transceiver 10 is inherently sensitive to the radar wave emitted by a transmitting channel thereof. At the transceiver 10 the intensity of the radar wave being emitted is larger by several orders of magnitude than any radar echo reflected off some object in the vicinity of the radar sensor 6. Therefore, in case of the transceiver emitting radar pulses at a single frequency, the transceiver 10 is sensitive to an echo only while it is not transmitting an impulse that might "leak" into the receiving channel. Alternatively, the transceiver 10 can be of the FMCW (frequency modulated continuous wave) type, i.e. it emits a continuous radar wave the frequency of which is continuously ramped, so that a frequency difference between the transmitted wave and the echo received at the same time is representative of the distance between the transceiver and the object from which the echo originates. In that case, the frequency difference between the outgoing wave and the received echo must exceed a certain threshold in order for the echo to be detectable. In either case, the transceiver 10 is surrounded by a so-called leakage range in which objects cannot be detected because their echo is made undetectable by the outgoing wave.

Within this leakage range, the radar beam 13 passes through a grid 14 formed of thin metallic wires 15 arranged parallel to each other in a regular pattern extending in a plane perpendicular to the propagation direction of beam 13. The width of the beam 13 is sufficient to irradiate a plurality of said wires 15. The length of the wires 15 should preferably be greater than the diameter of the beam 13, so that ends of the wires 15 can be mounted on a frame 16 that doesn't block the beam 13.

The diameter of the wires 15 is smaller than the wavelength of the radar beam 13; e.g. in case of the radar beam having a mean frequency fi of 100 GHz, corresponding to a wavelength li of 3 mm, the diameter of the wires is less than 3 mm, preferably less than 0.6 mm, and still more preferably, less than 0.3 mm, so that the wires do not cast a shadow at the downstream side of the grid 14 and do not reflect the radar beam 13, but merely scatter it.

Since the grid 14 is located within the leakage range, radar waves that scattered back from it to the transceiver 10 are not detected.

A second grid 17 having the same structure as grid 14 is provided in the path of beam 13 outside the leakage range. The two grids 14, 17 extend in parallel planes. The wires 15 of the two grids 14, 17 are aligned with each other, i.e. when seen in the propagation direction of beam 13, the wires 15 of one grid overlap with those of the other. The distance d between the two grids 14, 17 equals di2/2 i, so that if the wavelength of the radar beam is Xlr the first grid 14, by Talbot effect, gives rise to an intensity distribution of the radar wave in the plane of the grid 17 which has the form of a line grid whose intensity minima coincide with the wires of the grid 17. Therefore, when the transceiver 10 operates at the wavelength Xlr or is ramped in a small interval around Xlr the second grid 17 has no effect on the propagation of the radar beam 13.

It has an effect, however, when the wavelength emitted by transceiver 10 is sufficiently different from li for the wires 15 of grid 17 to be exposed to a substantial amount of radar radiation. In that case the grid 17 contributes to the radar echo received at transceiver 10, and since the grid 17 is outside the leakage range, this contribution is detected.

For this reason, in the embodiment contemplated here, the transceiver 10 is adapted to switch between two frequency ranges for ramping the frequency of the radar wave, the first one being centered around fi=c/Xlr the other around a different frequency f2. When the radar sensor 6 of this embodiment starts to operate, the transceiver 10 first emits in the frequency range around f2, and a radar echo from grid 17 is detected by transceiver 10. If the intensity of this echo has an expected non-vanishing intensity, it is concluded that the sensor 6 is functional, and the frequency of the transceiver 10 is switched over to a range around fi. In this way, although the radar beam 13 still passes through the grids 14 and 17 on its way from and to the transceiver 10, the grids 14, 17 leave no trace in the radar echo received, and contributions of objects and persons in the vicinity of the robot 1 can be detected with a minimum of back ground noise.

As shown in FIG. 2, the sensor 2 can have a rotating mirror 18 or similar mobile element for redirecting the beam 13 and thus scanning the surroundings of the sensor 6. The structure of the sensors 7 can be identical to that of the sensor 6, except for the rotating mirror 18, which isn't needed if, as shown in FIG. 1, several sensors 7 are distributed along a circumference of a link 4.

Figure 3:
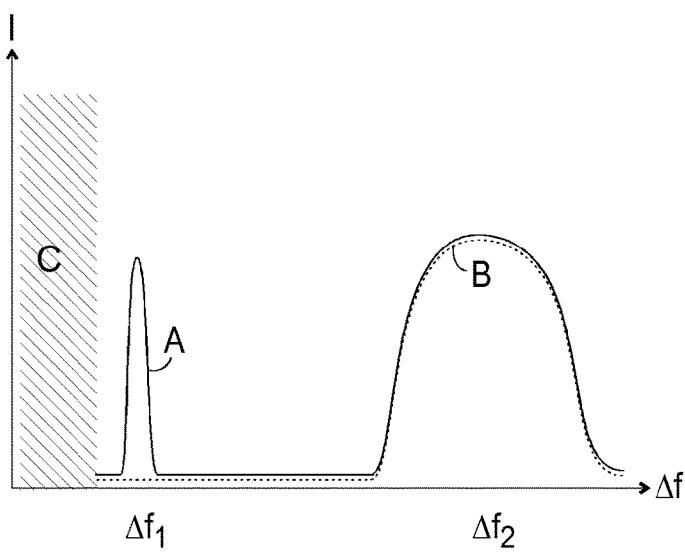
FIG. 3 is an example of a radar echo received by the transceiver of the radar sensor according to a first embodiment.

FIG. 3 gives schematic examples of echo signals detected by transceiver 10. If the frequency of the radar beam 13 is ramped linearly, the frequency difference between outgoing and incoming radar signals is directly representative of the distance between the transceiver 10 and an object which is the source of an echo. Curve A of FIG. 3 is obtained with the sensor operating around f2; at a small frequency difference Dii, just above the leakage range represented by hatched area C, there is the echo from grid 17; at a larger difference Di2, there is an echo from an object, e.g. from the robot 1 itself. When the sensor 6 is operating in the frequency range around fi, the radar beam 13 is unaffected by grid 17, and only the object contributes to the radar echo, but not the grid 17, as shown by curve B.

Figure 4:
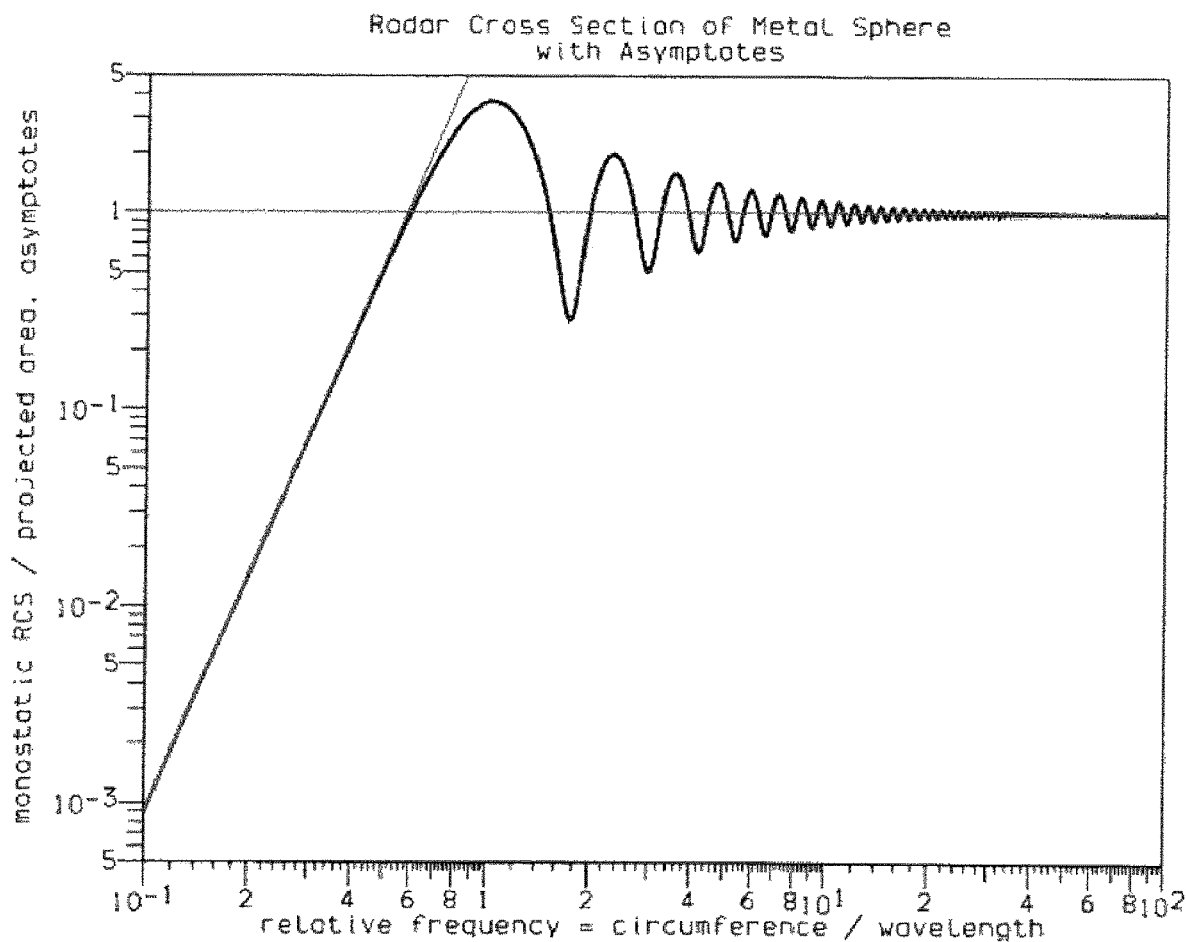
FIG. 4 is a graph illustrating the relative radar cross section of a metallic sphere as a function of relative frequency.

Due to the small diameter of the wires 15, the radar echo from grid 17 can be limited to a low value which will not overshadow an echo from an outside object, even if this outside object is close to the grid 17, and by appropriately choosing this diameter, the intensity of the radar echo from grid 17 can be set to any desired value. As shown in the diagram of FIG. 4, when the diameter of a metallic sphere is much larger that the radar wavelength, i.e. at a relative frequency of 10 or above, the ratio between radar cross section and projected area of the sphere converges towards unity. On the other hand, when the diameter is smaller than the wavelength, this ratio is proportional to the fourth power of the frequency. A similar relation holds for the wires 15 of grids 14 and 17. Therefore, the diameter of the wires 15 can be chosen so that although the grid 17 extends across the entire cross section of beam 13, the echo that originates from the grid 17 is only slightly above the detection threshold of transceiver 10.

Figure 5:
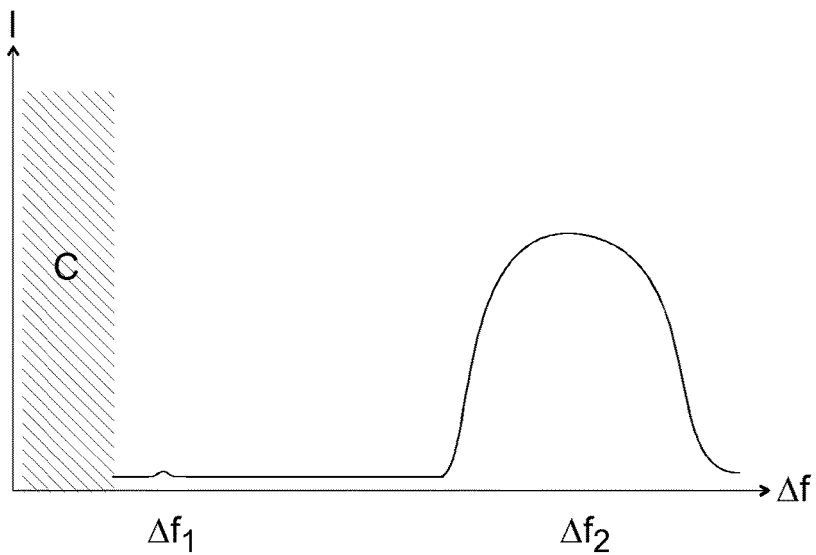
FIG. 5 is an example of a radar echo received by the transceiver of the radar sensor according to a second embodiment.

When the intensity of the echo from grid 17 is set as low as this, the radar sensor 6 can be simplified by dispensing with grid 14. In that case, the echo from the grid 17 is present continuously while the sensor 6 is operating, but this doesn't cause a problem, since this echo is too weak to conceal the echo of an outside object close to the leakage range that should be detected. Quite to the contrary, precisely because the echo from the grid 17 is weak, any malfunction of the sensor 6 is likely to cause it to drop below the detection threshold, whereby the malfunction is detected. An example of a typical radar echo signal according to this simplified embodiment is shown in FIG. 5 in a diagram analogous to that of FIG. 3.

According to this embodiment, the transceiver 10 can also be simplified, since there is no more need to switch between different frequency ranges. Since the echo from grid 17 is present whenever the sensor 6 is operating, and not only if it is operating in the frequency range around f2, a malfunction of sensor 6 is detected as soon as it occurs.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 robot
2 base
3 end effector
4 link
5 joint
6 radar sensor
7 radar sensor
8 floor
9 controller
10 transceiver unit
11 antenna
12 lens
13 beam
14 grid
15 wire
16 frame
17 grid
18 mirror

What is claimed is:
1. A radar sensor, comprising:
a transceiver unit configured to emit a radar beam along a beam path in an outgoing direction and to receive radar radiation along the beam path in an incoming direction; and a reference object placed in the beam path configured to redirect part of the outgoing radar beam in the incoming direction, wherein the reference object is one of a plurality of reference objects placed in the radar beam, wherein a size of each reference object of the plurality of reference objects in at least one dimension is smaller than a wavelength of the radar beam, and wherein a size of at least one reference object in a second dimension orthogonal to a first dimension is larger than the wavelength of the radar beam.

2. The radar sensor of claim 1, wherein at least some of the plurality of reference objects are located beyond a leakage range of the transceiver unit.

3. The radar sensor of claim 1, wherein a size of the reference object in the first dimension is smaller than half the wavelength.

4. The radar sensor of claim 3, wherein the size of the reference object in the first dimension is smaller than a fifth of the wave length.

5. The radar sensor of claim 4, wherein the size of the reference object in the first dimension is smaller than a tenth of the wavelength.

6. The radar sensor of claim 1, wherein the at least one reference object is stationarily mounted with respect to the transceiver unit.

7. The radar sensor of claim 1, wherein the plurality of reference objects comprise metallic wires.

8. The radar sensor of claim 1, wherein each reference object of the plurality of reference objects is linear and has first and second ends, and wherein the first and second ends of each reference object of the plurality of reference objects are mounted in a frame.

9. The radar sensor of claim 8, wherein the at least some reference objects are arranged in at least one plane that intersects the radar beam.

10. The radar sensor of claim 9, wherein the at least some reference objects are arranged in at least one regular pattern.

11. The radar sensor of claim 9, wherein the first regular pattern is located in a leakage zone of the transceiver unit.

12. The radar sensor of claim 9, wherein the at least some reference objects are arranged in first and second regular patterns, the first regular pattern extending in a first plane that intersects the beam, and the second regular pattern extending in a second plane parallel to the first plane, and wherein the transceiver unit is selectively operable at least a first and a second frequency, and a distance between the two patterns equals half a Talbot distance at the first frequency.

13. The radar sensor of claim 12, wherein, when the transceiver unit is operated at the first frequency, the reference objects of the second regular pattern are located in dark zones of a Talbot grid generated by the first regular pattern.

14. The radar sensor of claim 12, wherein the first regular pattern is located in a leakage zone of the transceiver unit.

15. A robot, comprising:

at least one link which is rotatably connected to a base, to an end effector, or to another link, wherein the at least one link is provided with at least one radar sensor of claim 1.

16. The radar sensor of claim 1, wherein the size of the at least one reference object in the second dimension is larger than a diameter of the radar beam.

* * * * *